United States Patent Office 3,632,685
Patented Jan. 4, 1972

3,632,685
RESINS AND MEMBRANES POSSESSING IONIC CONDUCTIVITY COMPRISING REACTION PRODUCTS OF DISULTONES AND POLYMERS CONTAINING TERTIARY AMINO GROUPS
Guy Bourat, Bourg-la-Reine, France, assignor to Rhone-Poulenc S.A., Paris, France
No Drawing. Filed Apr. 11, 1969, Ser. No. 815,505
Claims priority, application France, Apr. 12, 1968, 147,991
Int. Cl. C08f 7/12, 19/02, 15/06
U.S. Cl. 260—884   15 Claims

ABSTRACT OF THE DISCLOSURE

Resins possessing ionic conductivity and useful in fuel piles and electrical accumulators are made by reacting polymers containing tertiary amino groups with polysultones.

---

This invention relates to resins and membranes possessing ionic conductivity.

Materials used as separators of the anode and cathode compartments of electrochemical generators of electricity such as accumulators and fuel piles of the redox type must allow ionic entities to pass from one compartment to the other, while preventing, so far as possible, the passage of non-ionic entities, especially when there is a difference in pressure on the two sides of the separator.

The present invention provides a process for the preparation of a resin possessing ionic conductivity which comprises reacting one or more polysultones with a polymer containing in each molecule a plurality of tertiary amino groups.

The polysultone used is preferably a di-γ-sultone such as the di-γ-sultone of 1,2 - bis(p-nitro-o-sulphophenyl)-ethane-1,2-diol [Ruggli et al., Helv. Chim. Acta 9, 929–50 (1926)], methylene-dinaphthosultone [Schetty, Helv. Chim. Acta. 31, 1229 (1948)], dinaphthosultone [Allpart et al., J. Chem. Soc. 1958, 409, 0–4], and especially the di-γ-sultone of 2,2 - bis(hydroxymethyl)-propane-1,3-disulphonic acid [Goethals et al., Bull. Soc. Chim. Belg. 70–218–20 (1961)], hereinafter called spirobi-2:2′-propanesultone. The preparation of the resins of the invention will be described in detail only using this last disultone, but it is of course, always possible to replace it by one or more other polysultones. The polymers containing tertiary amino groups usually have a molecular weight of above 1000 and may be obtained by any known method. It is generally advantageous to use polymers which are easily accessible such as those obtained by homopolymerisation or copolymerisation of vinyl monomers having at least one teriary amino group. These monomers are generally but not exclusively monomers in which at least one of the carbon atoms which carries the vinyl double bond is attached to a cyclic radical with an intranuclear, juxtanuclear or extranuclear tertiary amino group. Amongst the monomers having an intranuclear tertiary amino group, i.e. a tertiary amino group within a heterocyclic nitrogen ring, vinylpyridine and its substitution derivatives are especially suitable. Amongst the monomers having a juxtanuclear tertiary amino group i.e. a tertiary amino group attached to a carbon atom of an aromatic ring, the dialkylaminovinylbenzenes and their substitution derivatives are especially suitable. Amongst the monomers having an extranuclear tertiary amino group i.e. a tertiary amino group attached to a carbon atom of an alkylene substituent of an aromatic ring, the dialkylaminoalkyl-p-vinylbenzenes and their substitution derivatives are especially suitable. Other suitable polymers which can be used in the invention are, for example, polyvinyl chlorides grafted with nitrogen-containing monomers such as those quoted above.

The resins produced by the new process may be used either in the pure state or more advantageously as an intimate mixture with the polymers which are chemically inert towards disultones. Polymers capable of conferring good mechanical properties on the membranes obtained from the mixtures are generally employed as inert polymers. Amongst these polymers, polyvinyl chloride and its copolymers, and polyvinylidene chloride are preferably used, these polymers advantageously having a molecular weight greater than 150,000. The use of polymers of high stereoregularity also falls within the scope of the present invention.

The inert polymer can be mixed with the resin produced in accordance with the invention, but in order to obtain a very homogeneous membrane it is preferable to mix it with the polymer containing tertiary amino groups and to react the disultone with the mixture. The reaction of the disultone with the tertiary amino groups of polymer takes place in known manner. Generally, a solution of the polymer, and optionally the inert polymer, is mixed with a solution of the disultone and the mixture then heated and the solvent evaporated. If a membrane is to be prepared, it is advantageous to cast the solution of polymer containing tertiary amino groups and disultone onto a surface and only then to heat and evaporate the solvent. Membranes of various shapes such as sheets, bags or tubes can be obtained by varying the geometry of the surface. If a reinforced membrane is needed, the solution can be cast onto a support such as a web or woven fabric.

In the case of spirobi-2:2′-propanesultone the reaction is advantageously carried out at a temperature above 30° C. but of course below the decomposition temperature of the reactants and products. The solvent used for carrying out the reaction between the disultone and the polymer containing tertiary amino groups is a solvent or mixture of solvents which is able to dissolve both the polymer and the disultone. The reaction mixture is advantageously made up by mixing the solution of the disultone and a solution of the polymer. The solvent for the disultone is preferably hexamethylphosphotriamide. The solvent for the polymer containing tertiary amino groups, optionally mixed with the inert polymer, is advantageously an ether such as dioxane, or a ketone such as methyl ethyl ketone or cyclohexanone, or an aliphatic or aromatic hydrocarbon.

The reaction of the disultone with the polymer having several tertiary amino groups is a cross-linking quaternisation. The introduction of the ionic groups, both sulphonic groups and quaternary ammonium groups, on the one hand, and the cross-linking of the starting polymer on the other, take place at the same time. This makes the invention very particularly valuable because of the excellent distribution of ionic sites within the polymer which this technique of cross-linking quaternisation produces. In fact, if the membranes used in electrochemical generators show a certain heterogeneity in the distribution of the ionic sites, distortions of the electric flux across the membrane occur and as a result local heatings take place in the areas of high electrical density, which ultimately reduces the life of the membrane.

The amount of disultone used in the preparation of the products according to the invention is calculated so as to quaternise a predetermined percentage of the tertiary nitrogen atoms. Thus, it is possible to quaternise 5 to 100%, preferably 30 to 50%, of the nitrogen atoms. The remaining nitrogen atoms can be quaternised without additional cross-linking by reaction with a monosultone. Propanesultone is preferred because of its high reactivity toward tertiary amino groups. This latter reaction is generally effected by simple heating, in a liquid medium, of the film or product obtained by the reaction of the disultone, with the polymer containing tertiary amino groups. The process for preparing a membrane according to the invention is advantageously completed with a wash using an alkaline solution followed by one using an acid solution to remove possible low molecular weight materials.

The resins produced in accordance with the invention are particularly valuable when used as membranes. These membranes are usually transparent, homogeneous, flexible and devoid of macropores, that is to say of pores of diameter greater than 50 A. They have a very low resistance to an electric current. They can be kept either in the wet state or in the "dry" state provided they have beforehand been subjected to treatment such as, for example, immersion in a mixture of water and glycerine, which prevents them from drying out completely.

The following examples illustrate the invention.

EXAMPLE 1

0.5 g. of polyvinyl chloride of molecular weight 240,000 and 0.5 g. of poly-para-dimethylaminostyrene of molecular weight 5,000 are dissolved in 22 cm.$^3$ of cyclohexanone. A second solution consisting of 0.11 g. of spirobi-2:2′-propanesultone dissolved in 1 cm.$^3$ of hexamethylphosphotriamide is added to the first solution. The mixture is heated for 1 hour at 115° C. and then poured onto a flat glass plate 20 cm. square. It is further heated for 1 hour at 115° C., allowed to cool, and the film detached by dipping the plate in water. The film is dipped in methanol for 10 minutes and then dried at ambient temperature.

The quaternisation is then completed as follows. The film is dipped in a solution of 2 g. of propanesultone in 200 cm.$^3$ of dibutyl ether and the whole is heated for 8 hours on a water bath at 95° C. The film is then washed with methanol as before, placed for 24 hours in N aqueous potassium hydroxide solution at ambient temperature, for 24 hours in N aqueous hydrochloric acid, washed with water, placed in a 50% aqueous glycerine for 8 hours, and finally dried with blotting paper.

A flexible, transparent membrane devoid of macropores and containing 4.5% of sulphur and 2.8% of nitrogen is obtained. Its substitution resistance is determined by measuring the variation in the resistance of a liquid layer of N aqueous hydrochloric acid if the membrane is substituted for a slice of the same thickness of the liquid layer, at right angles to the axis of the said layer. This substitution resistance is then than 0.1 $\Omega$cm.$^2$

EXAMPLE 2

0.5 g., of polyvinyl chloride of molecular weight 200,000 and 0.5 g. of poly-para-dimethylaminostyrene of molecular weight 5,000 are dissolved in 12.5 cm.$^3$ of cyclohexanone. A second solution of 0.18 g. of spirobi-2:2′-propanesultone in 10 cm.$^3$ of hexamethylphosphotriamide is added to the first solution. The mixture is homogenised and the resulting collodion is cast onto a glass plate 20 cm. square, heated to 115° C. After 1 hour at 115° C. the whole (plate and film) is dipped into dibutyl ether for 8 hours at 90° C. The film is then detached from the plate.

The final quaternisation with propanesultone and the various subsequent treatments are carried out as in Example 1.

A flexible, transparent membrane devoid of macropores is obtained which contains 5% of sulphur and 3% of nitrogen. Its substitution resistance in N aqueous hydrochloric acid is 0.18 $\Omega$cm.$^2$.

EXAMPLE 3

The procedure followed is as in Example 2 the only difference being that the solution of polymer and disultone is cast onto a glass plate 20 cm. x 10 cm. A flexible, transparent membrane devoid of macropores is obtained which contains 3% of nitrogen and has a substitution resistance in N aqueous hydrochloric acid of 0.18 $\Omega$cm.$^2$.

EXAMPLE 4

0.5 g. of polyvinyl chloride of molecular weight 200,000 and 0.5 g. of poly-para-dimethylaminostyrene of molecular weight 5,000 are dissolved in 12.5 cm.$^3$ of cyclohexanone. A second solution of 0.18 g. of spirobi-2:2′-propanesultone in 10 cm.$^3$ of hexamethylphosphotriamide is added to a first solution. The mixture is homogenised and the resulting collodion is cast onto a glass plate 20 cm. x 10 cm. heated to 115° C. After 1 hour at 115° C. the combination of plate and film is dipped for 8 hours at 90° C. in squalane containing 5% of hexamethylphosphotriamide. The film is then detached from the plate, dipped for 10 minutes in methanol, and dried at ambient temperature.

The quaternisation is then completed as follows. The film is dipped in a 5% solution of propanesultone in xylene and the whole is then heated to 90° C. for 12 hours. The film is then subjected to the same treatments as described in Example 1. A flexible, transparent membrane devoid of macropores is obtained, which contains 6.3% of sulphur and 3.0% of nitrogen and has a substitution resistance in N aqueous potassium hydroxide of 0.8 $\Omega$cm.$^2$.

EXAMPLE 5

5 g. of polyvinyl chloride having an AFNOR viscosity index of 420 cm.$^3$ per g. and an average molecular weight of 240,000 obtained by polymerisation of vinyl chloride at 2° C., and containing 5% of lauryl peroxide are introduced into 700 cm.$^3$ of an aqueous 2.5% solution of 4-vinylpyridine maintained at 70° C. After 2 hours of contact, the polymer is separated by filtration and washed by agitation for 48 hours in 500 cm.$^3$ of methanol at 20° C. After drying, 10 g. of a polyvinyl chloride/4-vinylpyridine graft copolymer are obtained. The gain in weight is 100%.

5 g. of this graft copolymer are dissolved at 60° C. in 95 g. of pyridine to produce a 5% by weight solution. 40 cm.$^3$ of this solution are poured onto a glass plate 20 cm. square. The solution is then cooled and the solvent evaporated at ambient temperature. The plate covered with the graft copolymer is then immersed in a methanol bath which allows the copolymer film to be detached. This film is immersed in a bath of 500 cm.$^3$ of isobutanol containing 5 g. of spirobis-2:2′-propanesultone. The mixture is then boiled for 6 hours. The membrane thus obtained is again immersed for 24 hours at ambient temperature in N aqueous sodium hydroxide solution. Finally the membrane is washed with water until the washings are neutral. A flexible transparent membrane is obtained containing 5.7% of sulphur and having a substitution resistance in 0.6 M potassium chloride solution less than 0.1 $\Omega$cm.$^2$.

EXAMPLE 6

40 cm.$^3$ of a solution in pyridine of a polyvinyl chloride/4-vinyl pyridine graft copolymer are prepared in the manner described in Example 5. 350 mg. of spirobi-2:2′-propanesultone are dissolved in this solution which is then poured onto a glass plate as described in Example 5. The solvent is evaporated at ambient temperature and the assembly of glass plate and film is immersed for 6 hours at 90° C. in 200 cm.$^3$ of squalane containing 5% by weight of hexamethylphosphotriamide. The film is then washed with cyclohexane and detached in a methanol bath. The membrane obtained is immersed for 2 hours at 80° C. in N sodium hydroxide solution and then washed with water till the washings are neutral. A flexible transparent membrane is thus obtained which contains 4.2% of sulphur and has a substitution resistance in 0.6 M potassium chloride solution of less than 0.1 $\Omega$cm.$^2$.

EXAMPLE 7

The membrane prepared as described in Example 6 is washed with methanol and immersed for 8 hours at 80° C. in 100 cm.³ of a 5% by weight solution of propanesultone in xylene. It is then washed with methanol, treated with N sodium hydroxide solution and washed with water, all as described in Example 6. The membrane obtained is flexible and transparent. It contains 6.2% of sulphur. Its resistance to substitution in 0.6 M potassium chloride solution is less than 0.1 Ωcm.².

I claim:
1. Process for the preparation of a resin possessing ionic conductivity which comprises reacting one or more disultones with a polymer containing in each molecule a plurality of tertiary amino groups selected from the groups consisting of:
   (a) tertiary amino groups within a heterocyclic nitrogen ring;
   (b) tertiary amino groups attached to a carbon atom of an aromatic ring;
   (c) tertiary amino groups attached to a carbon atom of an alkylene substituent of an aromatic ring.
2. Process according to claim 1 in which the disultone is the di-γ-sultone of 2,2-bis(hydroxymethyl)-propane-1,3-disulphonic acid.
3. Process according to claim 1 in which the tertiary amino groups of the polymer are within a heterocyclic nitrogen ring.
4. Process according to claim 3 in which the polymer is a homopolymer or copolymer of vinylpyridine.
5. Process according to claim 1 in which the tertiary amino groups of the polymer are attached to a carbon atom of an aromatic ring.
6. Process according to claim 5 in which the polymer is a homopolymer or copolymer of a dialkylaminovinylbenzene.
7. Process according to claim 1 in which the tertiary amino groups of the polymer are attached to a carbon atom of an alkylene substituent of an aromatic ring.
8. Process according to claim 7 in which the polymer is a homopolymer or copolymer of a dialkylaminoalkylvinylbenzene.
9. Process according to claim 1 in which the polymer is a polymer or copolymer grafted with a monomer containing at least one tertiary nitrogen atom.
10. Process according to claim 1 in which the polymer has a molecular weight above 1,000.
11. Process according to claim 1 in which a polymer which is chemically inert towards sultones is included in the reaction mixture.
12. Process according to claim 11 in which the inert polymer is a homopolymer or copolymer of vinyl chloride.
13. Process according to claim 1 in which the number of sultone groups is at least equal to 5% of the number of tertiary amino groups and any remaining tertiary amino groups are subsequently quaternised with a monosultone.
14. Process according to claim 13 in which the number of sultone groups of the disultone is 30 to 50% of the number of tertiary amino groups.
15. Process according to claim 13 in which any remaining tertiary amino groups are quaternised with propanesultone.

References Cited
FOREIGN PATENTS
1,042,848  9/1966  Great Britain _____ 260—79.5

MURRAY TILLMAN, Primary Examiner

J. SEIBERT, Assistant Examiner

U.S. Cl. X.R.

260—2.1 R, 30.6 R, 32.8 N, 33.2 R, 33.6 UA, 79.3 R, 79.3 M, 79.5 R, 88.3 R, 28.7 S, 899